C. ALLEN.
SLIME SEPARATOR AND CLASSIFIER.
APPLICATION FILED AUG. 26, 1912. RENEWED DEC. 9, 1914.

1,147,356.

Patented July 20, 1915.
3 SHEETS—SHEET 1.

WITNESSES:
Charles Pickles
F. E. Maynard.

INVENTOR
Charles Allen.
BY G. H. Strong.
ATTORNEY

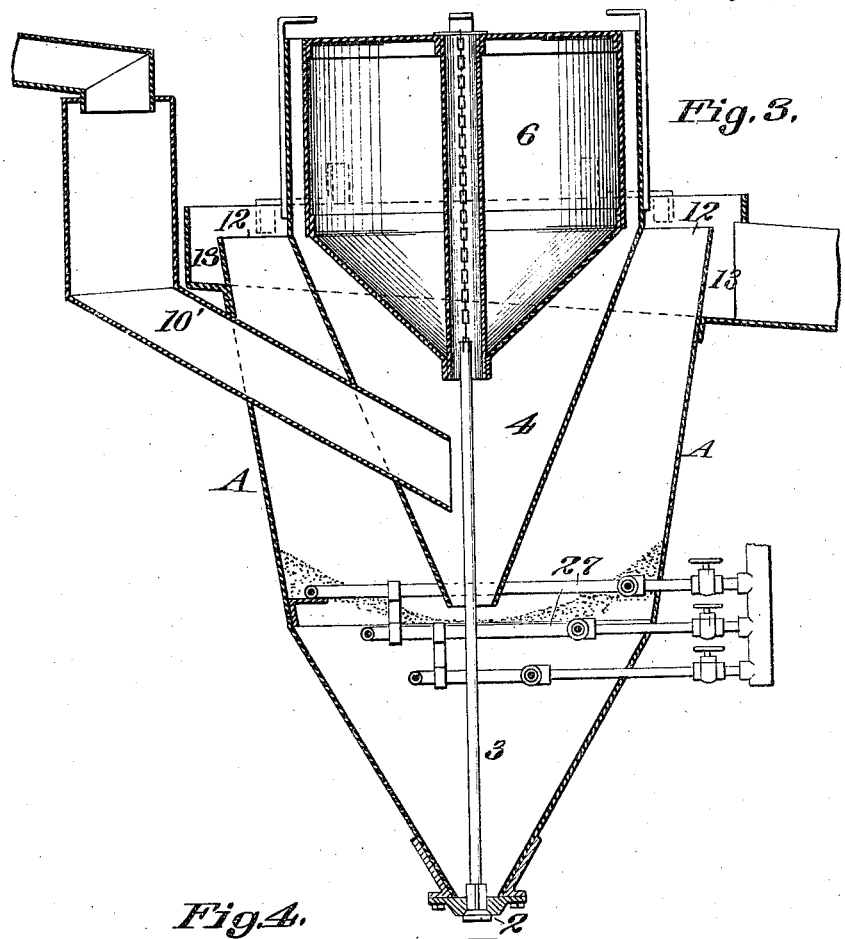
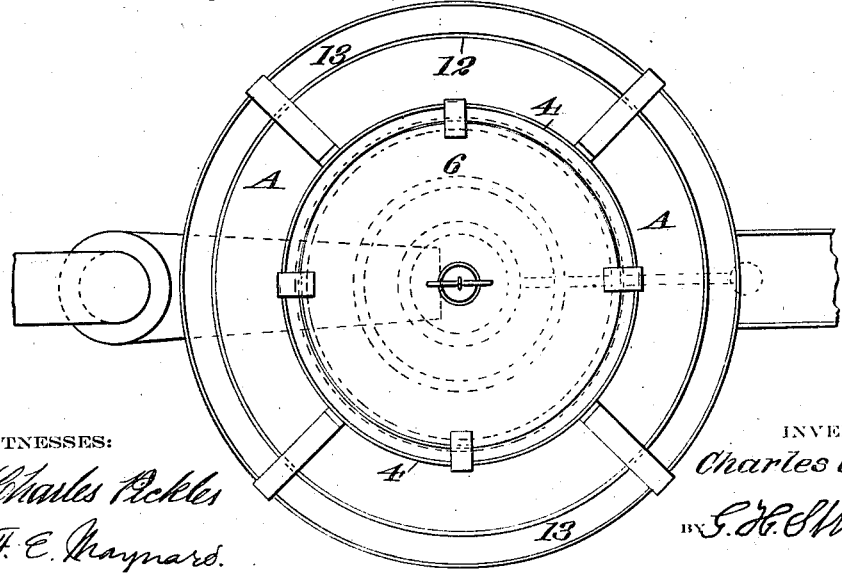

C. ALLEN.
SLIME SEPARATOR AND CLASSIFIER.
APPLICATION FILED AUG. 26, 1912. RENEWED DEC. 9, 1914.
1,147,356.
Patented July 20, 1915.
3 SHEETS—SHEET 3.
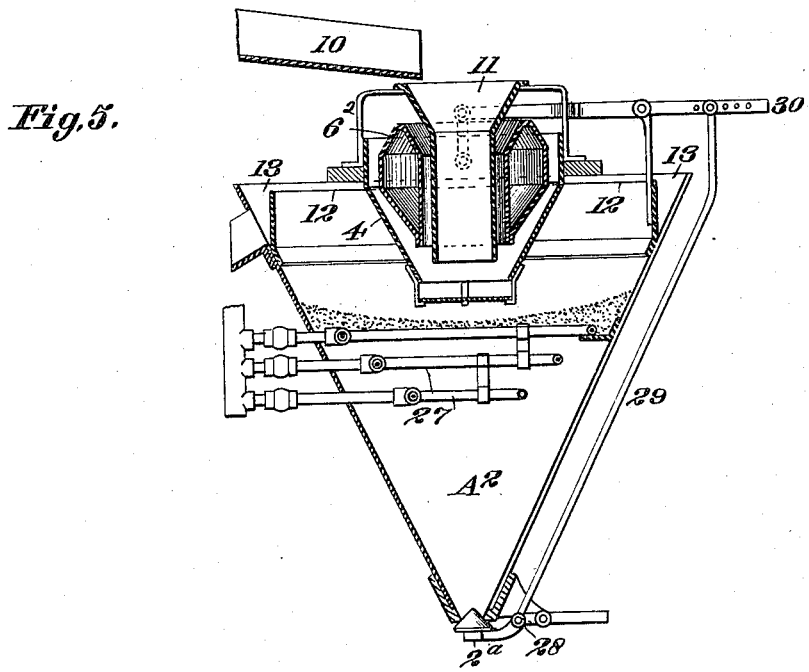
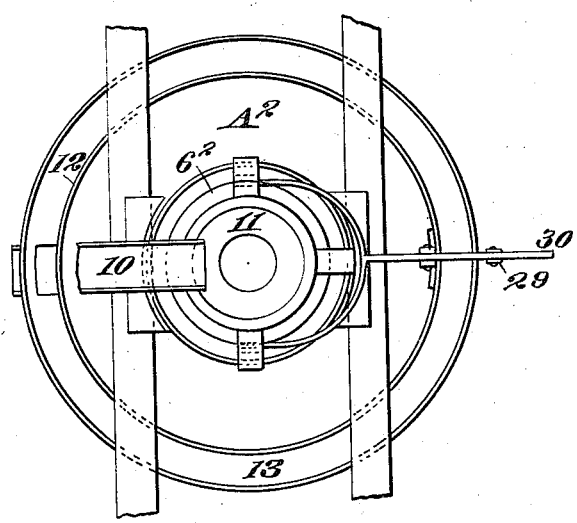
WITNESSES:
Charles Pickles
F. E. Maynard.
INVENTOR
Charles Allen,
BY G. H. Strong,
ATTORNEY

UNITED STATES PATENT OFFICE.

CHARLES ALLEN, OF EL PASO, TEXAS.

SLIME SEPARATOR AND CLASSIFIER.

1,147,356.  Specification of Letters Patent.  Patented July 20, 1915.

Application filed August 26, 1912, Serial No. 717,117. Renewed December 9, 1914. Serial No. 876,362.

*To all whom it may concern:*

Be it known that I, CHARLES ALLEN, a citizen of the United States, residing at El Paso, in the county of El Paso and State of Texas, have invented new and useful Improvements in Slime Separators and Classifiers, of which the following is a specification.

This invention relates to settlers and separators for use in mining, for separating solids and liquids in the treatment of pulp and slimes.

The particular object of the present invention is to devise a simple, practical settler and separator, which is also capable of use as a classifier, wherein are arranged two compartments, one within the other; the solids being delivered into the outer compartment through the inner one, and being so constructed and arranged that the obstruction by the solids to the flow of water from one compartment to the other causes a difference in water level in the compartments; and the use of means acted upon by the difference in water level to open and close an outlet for the settled particles from the outer compartment in proportion to the variations in said water level; the result being a continuous discharge of settled particles.

The invention consists of the parts and the construction and combination of parts as hereinafter more fully described and claimed, having reference to the accompanying drawings, in which—

Figure 1:
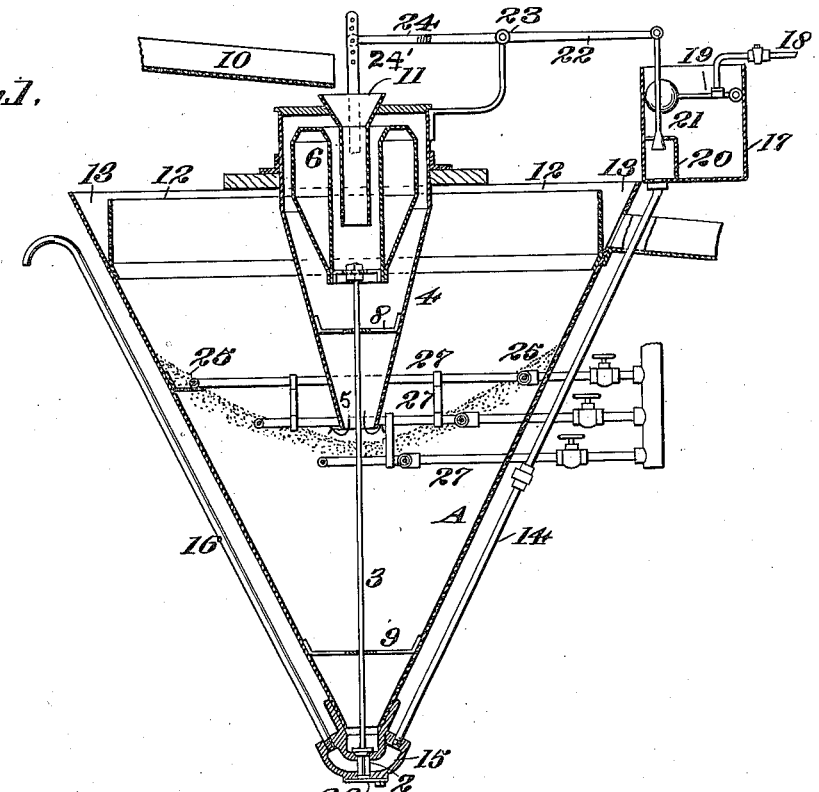
Figure 2:
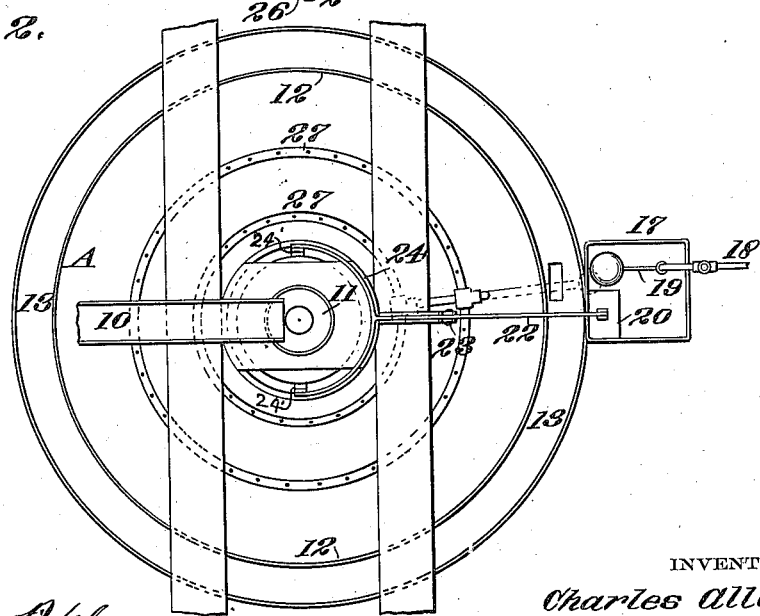

Figure 1 is a vertical section of an apparatus illustrating the invention. Fig. 2 is a plan view of the same apparatus. Fig. 3 is a vertical section of the apparatus showing a modification, from which the siphon attachment of Fig. 1 is omitted. Fig. 4 is a plan view of the device of Fig. 3. Fig. 5 is a vertical section showing a further modification of the invention, wherein there is used an automatic valve working entirely outside the tank. Fig. 6 is a plan view of the apparatus of Fig. 5.

Referring to Fig. 1, A is an inverted stationary settling cone having a discharge for the solids at the apex, which discharge is controlled by a valve 2, carried on a valve stem 3 arranged inside the cone and operated in the manner hereinafter to be described.

4 is an inside inverted open-ended cone which is also stationary with respect to the outer cone A and adapted to have its open mouth 5 extend down a considerable distance and be submerged within the tank.

6 is a float arranged inside the hopper or inner cone 4, and to which float the valve stem 3 is connected.

8 and 9 are guides for the valve stem.

10 is the launder conducting the mill stream to the settler and discharging into the hopper 11, through which hopper the stream containing sands and water to be separated is delivered down through the circular float 6 and into and beneath the water level in the inner cone 4; the solids thus settling down through the orifice 5 at the apex of the inner cone and collecting in the bottom of the outer fixed cone A over valve 2. The water which enters continually from the launder also passes through the orifice 5, and thence upward in tank A to the overflow lip 12 into a launder 13, thence to be discharged from the tank.

14 is a pipe which is adapted to deliver water from any appropriate source into a chamber 15, arranged below the discharge valve 2, and which chamber is designed to receive discharged solids allowed to escape from tank A, when valve 2 is open; the solids so discharged being carried from the chamber 15 through the siphon column 16.

In the present instance I have shown the water for the siphon discharge being received from a box 17 receiving water from a water supply pipe 18; the admission of water from pipe 18 to box 17 being controlled by a suitable float valve mechanism 19.

Inside of box 17 is a compartment 20, into which water may be admitted from time to time by the operation of a valve 21, which latter is adjustably connected with the float 6. It is here shown that valve 21 is adjustably connected with a walking beam 22, fulcrumed at 23 to a fixed part of the apparatus, and having adjustable connections by means of a yoke 24 and the upstanding arms 24' with the float 6. The siphon discharge pipe 14 taps into the compartment 20, so it is thus seen that as the float 6 rises, it opens valves 2 and 21, allowing solids to enter chamber 15 from tank A and water to enter compartment 20 from box 17; the liberated solids being washed out through the siphon column 16 by the water thus admitted through pipe 14.

The operation of the apparatus is as follows: The mill stream of water and solids flows from the sluice 10 into the hopper 11, thence through the inner cone 4; the solids settling in the outside cone A and the water rising from the outlet 5 finally to pass off over the lip 12 into the launder 13 to be discharged from the apparatus. When the cone A is full of water and until the solid particles obstruct the flow through outlet 5, the water level is the same in both cones, and under these conditions valves 2 and 21 remain normally closed. When the solid particles accumulate in the outside cone to the height indicated by the irregular line 25 so as to obstruct the free passage of the water through the orifice 5, the continued inflow of water into the inner cone 4 will cause the water level in the inner cone to rise above the normal, and in so doing will lift float 6; the water level in the outer cone A remaining constant. When the float 6 rises, it opens the outlet valve 2 for the solids by pulling up on stem 3, permitting the outflow of the solids, or a portion of them, from the settling cone A. If the plate 26, which normally closes the bottom of chamber 15 is removed, the discharge of the settled particles will pass out as unwatered material, provided, of course, that the valve 21 is allowed to remain closed, as would be the case if the walking beam 22 was disconnected from the float. If the plate 26 is closed and valve 21 connected with the float, then valve 21 will open correspondingly with valve 2 so that the discharged solids will be removed through the siphon.

It is designed that the valve 2 will be gradually opened until the surface of the particles in the settling cone is at the point where the discharge through the valve equals the quantity of particles settling in the cone A and the obstruction of the water flow through the mouth 5 is just sufficient to raise the float 6 the required height. Should the entrance of solids through the inner cone cease, the discharge past the valve 2 will continue until the water level in the inner cone 4 has lowered sufficiently to cause the float 6 to descend far enough to close valve 2; the volume of water used to carry the particles through pipe 16 being automatically controlled by the float.

It is understood that the box 17 is sufficiently above the outlet of the inverted siphon 16 to have enough velocity head to carry through pipe 16 the maximum quantity of solid particles that can pass out from the cone A. The present arrangement accomplishes one object of the invention, which is to reduce the mill height necessary, by reducing the vertical distance between the inflow through sluice 10 and the discharge from pipe 16.

If it is desired to wash the settled particles in cone A, pressure water may be introduced into the mass through a series of one or more perforated annular pipes 27.

In Figs. 3 and 4 there is illustrated a modification of the invention, differing chiefly from Fig. 1 in the omission of the hydraulic siphon discharge; and in the further particular that the water and slimes to be settled are admitted to the inner compartment 4 through a pipe 10' which penetrates the sides of both the outer and inner cones A and 4.

In Fig. 3 the settled particles are shown as assuming a dish-shaped surface, over which flows the rising current of water, continually washing upward any solid particles not heavy enough or large enough to completely resist the action of the upward flowing water. The large area of surface particles exposed to this washing and classifying action insures each particle being subjected to it for a considerable time, the greater the surface area the slower the sinking of the surface particles into the mass. To insure a thorough washing and classifying of the solid particles before they settle to any great depth in the mass, they may be subjected to washing and agitation by means of water, or air, or both, issuing from the holes in the pipes 27'.

In Fig. 5 is shown a further modification, in which the valve $2^a$ is disposed outside the tank $A^2$, being fulcrumed, as shown at 28, and connected by a bent link 29 with a lever 30, which latter is connected to the float $6^2$. The movement of the float through the connections 30 and 29 acts to open and close the valve $2^a$ to allow for the escape, or to impede the flow, of the solids from the tank $A^2$.

In all these forms the operation of the control device is substantially the same; the control of the discharge for the solids being automatic and being regulated in proportion to the amount of solids entering with the mill stream. Under normal working conditions the discharge of the settled solids will be practically continuous.

While ordinarily valves 2—21 will remain closed when the water level is the same in both cones, it is some times desirable to permit a flow of water through valve 21 when valve 2 is closed, to prevent solid particles from accumulating in the lower ends of pipes 14—16, or in the space between them. To do this it is only necessary to adjust valve 21 by means of the yoke 24 on the uprights 24' so that valve 21 remains slightly open when valve 2 is closed; valve 21 opening more as the float falls and valve 2 opens. This provides automatically for the adding to the discharging solids of a water volume proportionate to the quantity of solids discharged.

It may not always be necessary or desirable to use the air or wash water pipes 27.

Having thus described my invention, what I claim and desire to secure by Letters Patent is—

1. A separator for liquids and solids, consisting of a tank in the form of an inverted cone having a discharge for the solids at its bottom, a receptacle within the tank into which the material to be separated is admitted, said receptacle having a discharge passage into the tank controlled by the accumulated solids about said outlet in the tank, and means operative by change of water level in the receptacle occasioned by the change in level of the accumulated solids in the tank, to effect an automatic discharge of the solids from the tank.

2. In a separator and classifier, the combination of two inverted cones, one inside the other, the outside cone having a discharge at its apex for the solids and a rim overflow, the inside cone having an opening into the outer cone, and means controlling the discharge of solids from the outside cone by change of water level in the inner cone, means for effecting said change of water level in the inner cone by the variations in level of the accumulated solids in the outer cone.

3. In a combined separator and classifier, the combination of two open-ended inverted cones, one inside the other, the mouth of the inside cone controlling the discharge of solids from the outside one by causing water to rise in he inside one when the mouth of the inside one is closed, a valve normally closing the discharge opening of the outer cone and controlling the discharge of the solids, and means actuated by the change in water level in the inside cone to operate said valve.

4. In a separator and classifier, the combination of two intercommunicating chambers, one an outside settling chamber and the other an inside feed chamber through which the material to be acted upon is delivered to the settling chamber, a float in the feed chamber, said settling chamber having an outlet for the solids, a valve controlling said outlet, and means controlled by the rise and fall of said float to operate said valve.

5. In a separator and classifier, the combination of a settling tank having a discharge opening for the solids at its bottom, a receptacle within the tank having a submerged discharge opening into the body of water and material in the tank, means for delivering the water and solids to be separated into the receptacle and thence through its outlet into the tank, a valve in said tank outlet, said tank and receptacle constructed and arranged so that on the accumulation of a sufficient quantity of solids in the tank said outlet from the receptacle into the tank is closed, and means operated by the difference in the water level occasioned thereby in the receptacle and tank, for operating said valve.

6. In a separator and classifier, the combination of a settling tank having a discharge outlet in its bottom, a receptacle arranged within the tank and having a submerged outlet into the tank, said receptacle being fixed with relation to the tank, a float in the receptacle, a valve for said outlet in the tank, means by which on the accumulation of a sufficient quantity of solids in the tank said float is operated, a lever connected with the float, and connections between the lever and valve for operating the valve in harmony with the rise and fall of the float.

7. In a separator and classifier, the combination of a settling tank having a discharge outlet in its bottom, a receptacle arranged within the tank and having a submerged outlet into the tank, said receptacle being fixed with relation to the tank, a float in the receptacle, a valve for said outlet in the tank, a lever connected with the float, and connections between the lever and valve for operating the valve in harmony with the rise and fall of the float, said tank having a rim overflow, and said receptacle and its outlet into the tank arranged so that variations in said water level in the receptacle are effected by the accumulation of solids in the tank and about said outlet from the receptacle.

8. A separator for liquids and solids, consisting of a tank in the form of an inverted cone having a discharge for the solids at its bottom, a receptacle within the tank into which the material to be separated is admitted, said receptacle having a discharge passage into the tank controlled by the accumulated solids over said outlet in the tank, means operative by change of water level in the receptacle occasioned by the change in level of the accumulated solids in the tank, to effect an automatic discharge of the solids from the tank, and perforated pipes embedded in the body of solids in the tank for delivering fluid thereinto.

In testimony whereof I have hereunto set my hand in the presence of two subscribing witnesses.

CHARLES ALLEN.

Witnesses:
ARTHUR H. SWETT,
U. G. WOLFE.